(12) United States Patent
Aoki

(10) Patent No.: US 12,573,423 B1
(45) Date of Patent: Mar. 10, 2026

(54) MAGNETIC DISK DEVICE AND CONTROLLING METHOD OF THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takahiro Aoki, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/062,575

(22) Filed: Feb. 25, 2025

(30) Foreign Application Priority Data

Sep. 12, 2024 (JP) ................................. 2024-158384

(51) Int. Cl.
*G11B 5/55* (2006.01)
*G11B 5/596* (2006.01)

(52) U.S. Cl.
CPC ........ *G11B 5/5547* (2013.01); *G11B 5/59666* (2013.01)

(58) Field of Classification Search
None
See application file for complete search history.

(56) References Cited

U.S. PATENT DOCUMENTS

| | | | |
|---|---|---|---|
| 7,212,364 B1 * | 5/2007 | Lee .................... | G11B 5/59655 360/77.02 |
| 7,349,171 B2 | 3/2008 | Rutherford et al. | |
| 7,463,438 B2 | 12/2008 | Kosugi et al. | |
| 7,929,238 B1 * | 4/2011 | Vasquez ............... | G11B 5/5547 360/51 |
| 8,687,308 B1 | 4/2014 | Katchmart | |
| 8,817,405 B1 * | 8/2014 | Dhanda .............. | G11B 5/59655 360/51 |
| 8,982,490 B1 * | 3/2015 | Park ................... | G11B 5/59661 360/48 |
| 9,865,290 B1 * | 1/2018 | Liang .................... | G11B 5/024 |
| 11,087,788 B1 | 8/2021 | Katchmart | |
| 2007/0076314 A1 * | 4/2007 | Rigney .............. | G11B 5/59688 360/75 |
| 2018/0261244 A1 * | 9/2018 | Gerasimov ........ | G11B 5/59638 |

* cited by examiner

*Primary Examiner* — Peter Vincent Agustin
(74) *Attorney, Agent, or Firm* — Knobbe, Martens, Olson & Bear, LLP

(57) ABSTRACT

According to one embodiment, a magnetic disk device including a controller. The controller writes adjustment patterns, reads the written adjustment patterns, and detects the number of signal components of the sync mark included in the read signal, selects a frequency of an adjustment pattern from which the detected number larger than or equal to a threshold value is obtained, among the read adjustment patterns, as a write frequency of each of magnetic heads, writes spiral patterns including the sync mark in each predetermined cycle with the same frequency as each of the selected write frequencies, and writes a servo pattern, while tracking each of the written spiral patterns.

11 Claims, 16 Drawing Sheets

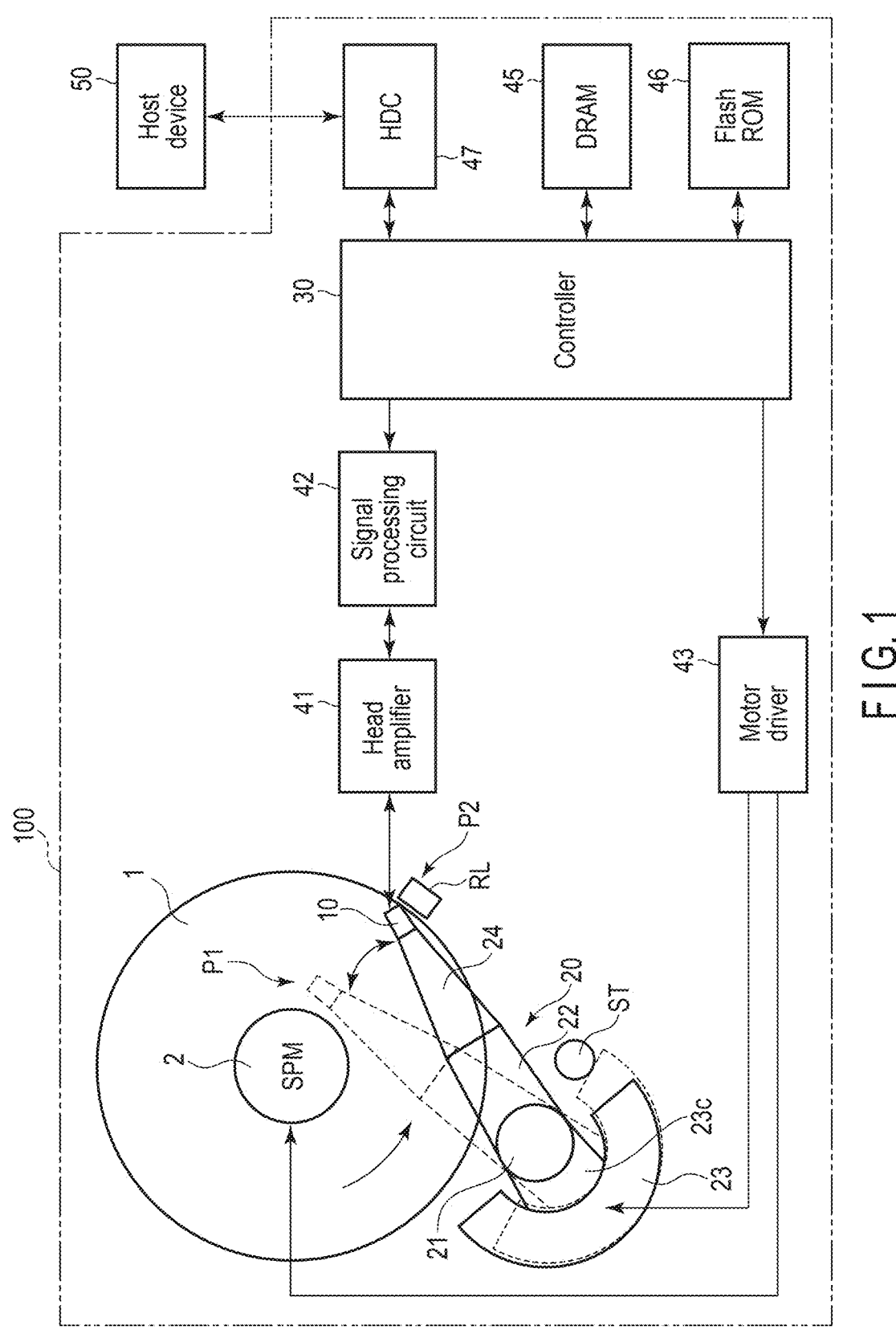
F I G. 1

| Head No. | Pattern I | Pattern II | Pattern III | Pattern IV |
|----------|-----------|------------|-------------|------------|
| H9 | – | L1, L2, L3 | B | C |
| H8 | – | L1, L2, L3 | B | C |
| H7 | – | L1, L2, L3 | B | C |
| H6 | A | L1, L2, L3 | B | C |
| H5 | – | L1, L2, L3 | B | C |
| H4 | – | L1, L2, L3 | B | C |
| H3 | – | L1, L2, L3 | B | C |
| H2 | B & C | – | – | – |
| H1 | – | L1, L2, L3 | B | C |
| H0 | – | L1, L2, L3 | B | C |

FIG.6

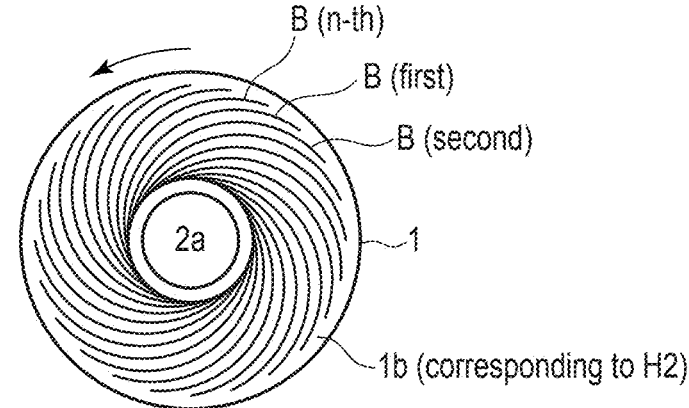
F I G. 9
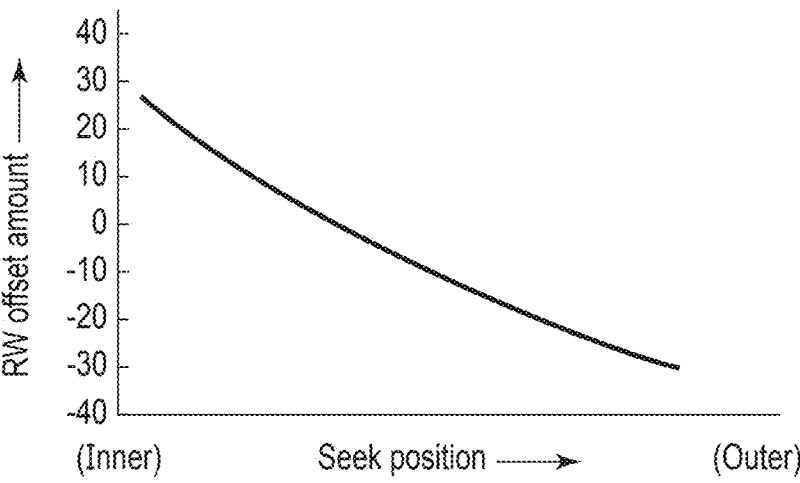
F I G. 10

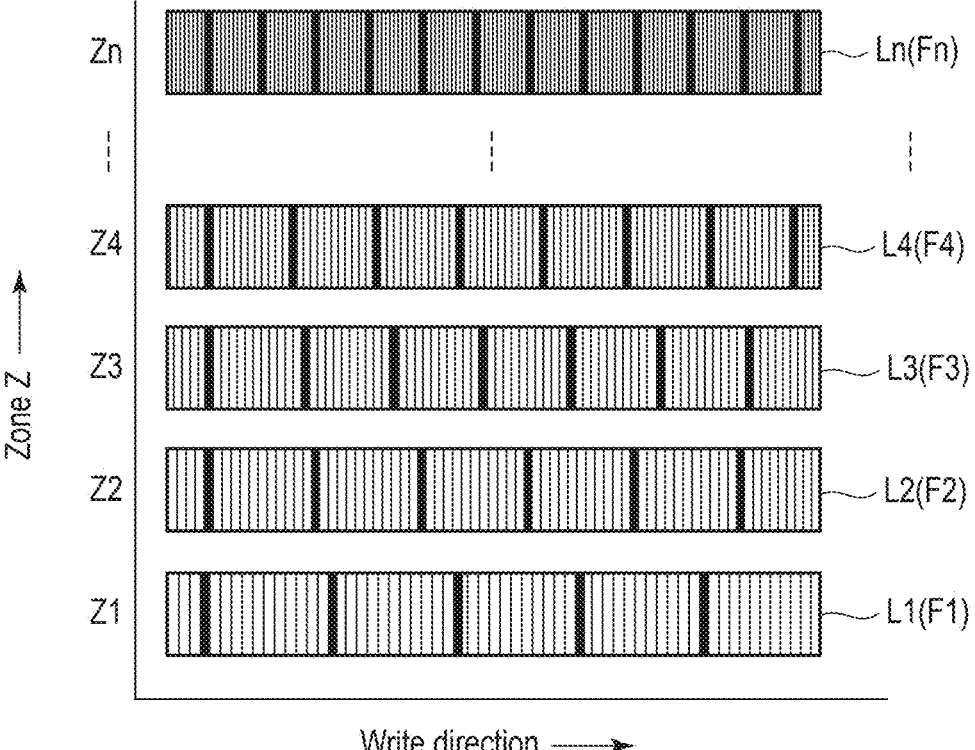
F I G. 13

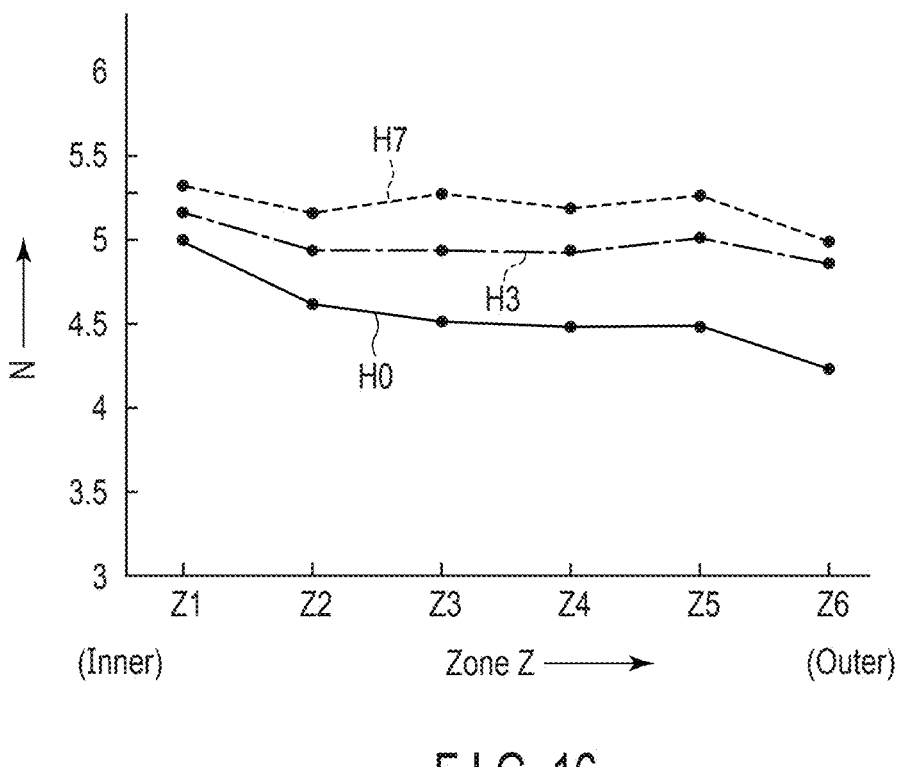
F I G. 16
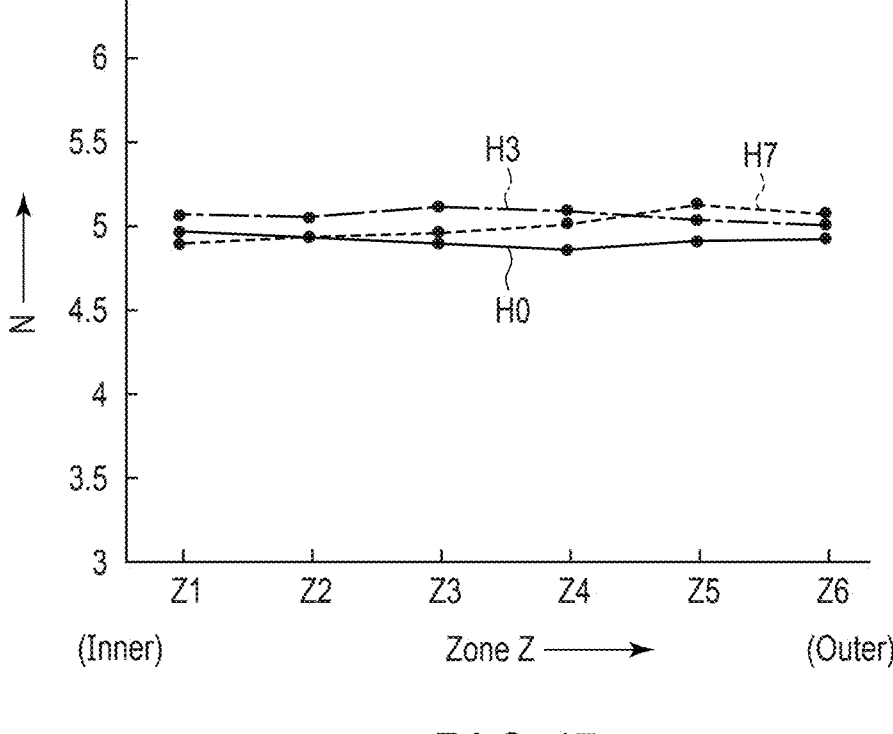
F I G. 17

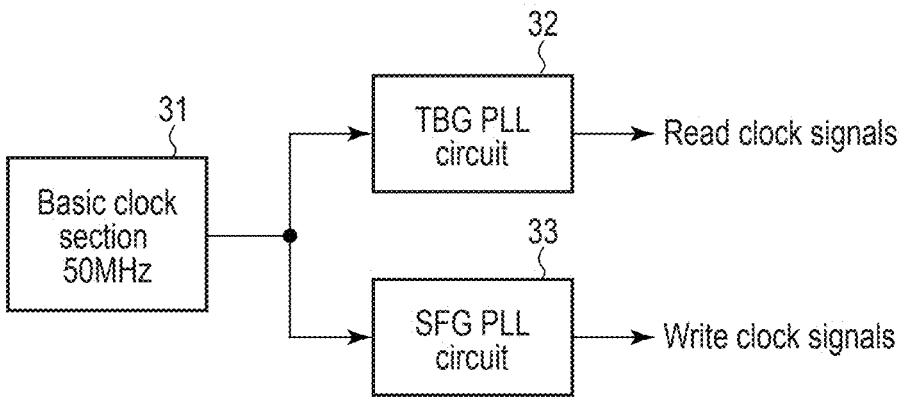
F I G. 18
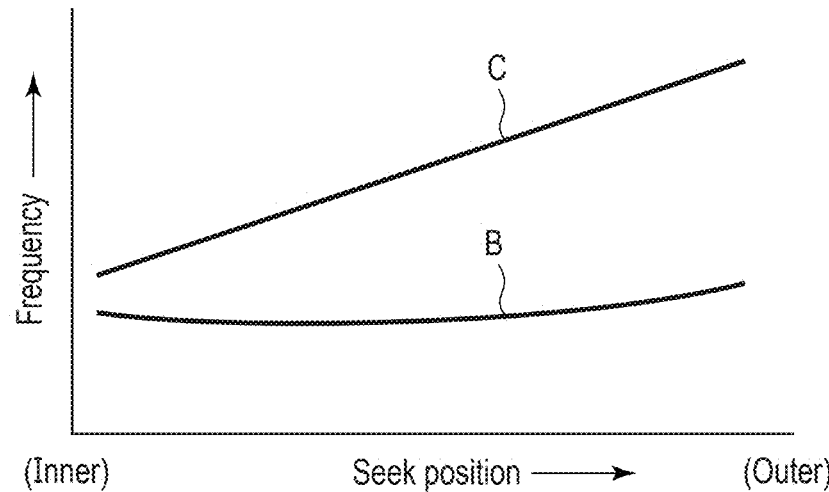
F I G. 19

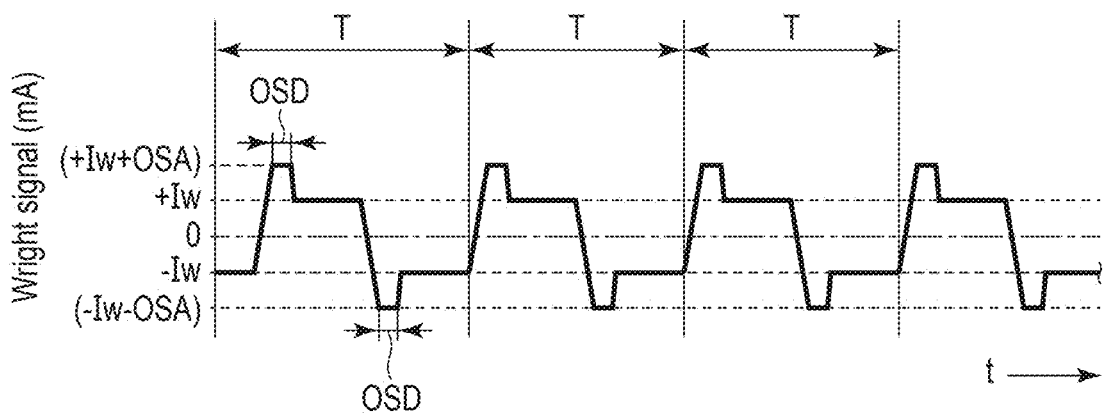
F I G. 21
| Wright conditions | Iw [mA] | OSA [mA] | OSD [ps] |
|---|---|---|---|
| w1 | 40 | 10 | 120 |
| w2 | 40 | 20 | 120 |
| w3 | 40 | 10 | 240 |
| w4 | 40 | 20 | 240 |
| w5 | 50 | 10 | 120 |
| w6 | 50 | 20 | 120 |
| w7 | 50 | 10 | 240 |
| w8 | 50 | 20 | 240 |
| w9 | 60 | 10 | 120 |
| w10 | 60 | 20 | 120 |
| w11 | 60 | 10 | 240 |
| w12 | 60 | 20 | 240 |
F I G. 22

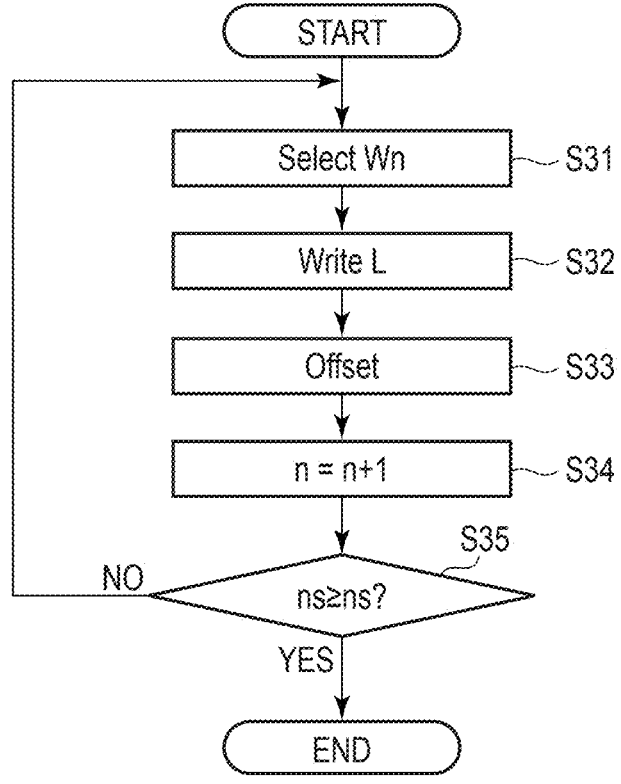
F I G. 23

MAGNETIC DISK DEVICE AND CONTROLLING METHOD OF THE SAME

CROSS-REFERENCE TO RELATED APPLICATIONS

This application is based upon and claims the benefit of priority from Japanese Patent Application No. 2024-158384, filed Sep. 12, 2024, the entire contents of which are incorporated herein by reference.

FIELD

Embodiments described herein relate generally to a magnetic disk device comprising a plurality of magnetic disks and a plurality of magnetic heads, and a controlling method of the same.

BACKGROUND

A controller of a magnetic disk device comprising a plurality of magnetic disks and a plurality of magnetic heads that write data to and read data from each of the magnetic disks executes a process referred to as Self Servo Write (SSW), of writing a plurality of servo patterns serving as references to positioning control of each of the magnetic heads, to each magnetic disk that is a blank medium with no data recorded thereon, in a process of manufacturing the magnetic disk device.

In this process, the controller writes a guide spiral pattern to one magnetic disk using one magnetic head, and then writes a final spiral pattern to each magnetic disk using each magnetic head while tracking the written guide spiral pattern with each magnetic head.

Then, the controller writes a servo pattern (referred to as a product servo pattern) that is used as a reference to positioning control of each magnetic head, to each magnetic disk, using each magnetic head, while tracking each written final spiral pattern with each magnetic head.

The guide spiral pattern and the final spiral pattern are magnetic patterns in which magnetic intensity changes at a predetermined frequency and which include a sync mark at predetermined intervals.

When tracking the guide spiral pattern and the final spiral pattern with the magnetic head, the controller detects a signal component corresponding to the sync mark from the read signal of the magnetic head and controls the movement of the magnetic head according to the detection results.

A data write width (i.e., a width in a direction orthogonal to a write direction) of the plurality of magnetic heads mounted on the magnetic disk device is not constant due to manufacturing variations. In some cases, a wide spiral pattern is written or a narrow spiral pattern is written.

When a narrow spiral pattern is written, the read area of the magnetic head for the spiral pattern becomes smaller. In this case, the signal component of the sync mark included in the read signal of the magnetic head becomes smaller and, as a result, errors may occur in the tracking of the spiral pattern. The errors become factors that worsen the accuracy of the servo pattern writing.

BRIEF DESCRIPTION OF THE DRAWINGS

FIG. 1 is a view showing a configuration of first to third embodiments.

FIG. 6 is a table showing a format of a writing pattern of each of the magnetic heads in each of the embodiments.
FIG. 9 is a view showing each final spiral pattern in each of the embodiments.
FIG. 10 is a graph showing a situation in which an offset amount of a read element and a write element of the magnetic head in each of the embodiments is changed in accordance with a seek position of the magnetic head.
FIG. 13 is a view showing difference in frequency of each adjustment pattern in each of the embodiments.
FIG. 16 is a graph showing a relationship between the number of sync marks detected from a read signal of each of the magnetic heads and a seek position (zone) of each of the magnetic heads in prior art.
FIG. 17 is a graph showing a relationship between the number of sync marks detected from a read signal of each of the magnetic heads and a seek position (zone) of each of the magnetic heads in each of the embodiments.
FIG. 18 is a view showing a unit of generating a data read clock signal and a data write clock signal in each of the embodiments.
FIG. 19 is a graph showing a relationship between frequencies of final spiral pattern B and product servo pattern C and the seek position of the magnetic head in each of the embodiments.
FIG. 21 is a view showing a waveform of a write signal according to a third embodiment.
FIG. 22 is a view showing a plurality of write conditions according to the third embodiment.
FIG. 23 is a flowchart showing selective control of each write condition according to the third embodiment.

DETAILED DESCRIPTION

Figure 2:
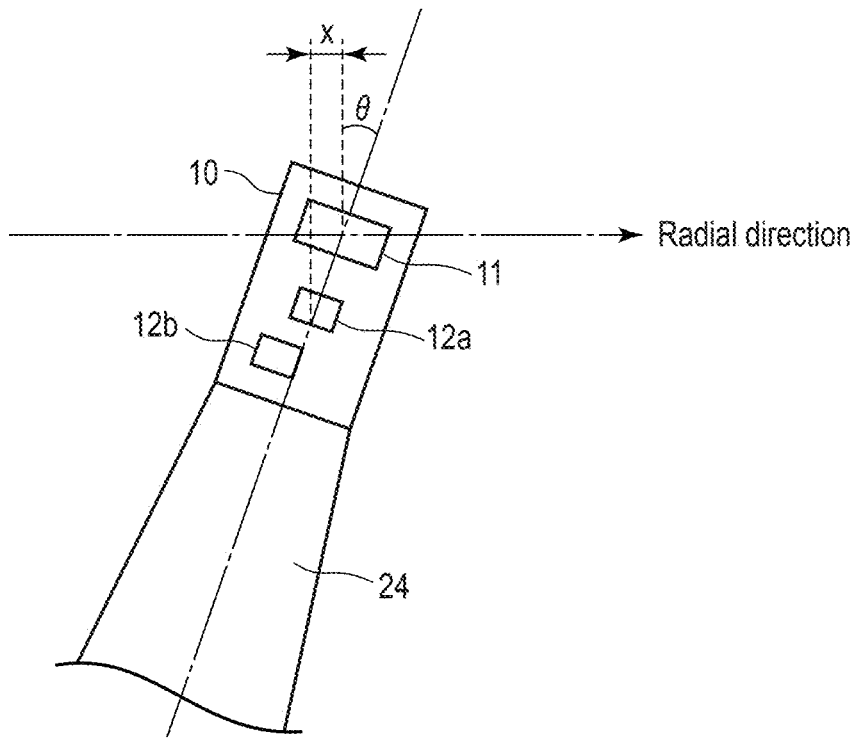
FIG. 2 is a view showing a configuration of main portions of a magnetic head in each of the embodiments.

In general, according to one embodiment, a magnetic disk device comprising a plurality of rotatable magnetic disks; a plurality of magnetic heads capable of seeking in a radial direction of each of the magnetic disks to write data to and read data from each of the magnetic disks; and a controller which controls the rotation of each of the magnetic disks and the seek of each of the magnetic heads. The controller writes a plurality of adjustment patterns including a sync mark in each predetermined cycle with different frequencies, to each of the magnetic disks by each of the magnetic heads; reads each of the written adjustment patterns by each of the magnetic heads, and detects the number of signal components of the sync mark included in the read signal of each of the magnetic heads; selects a frequency of an adjustment pattern from which the detected number larger than or equal to a threshold value is obtained, among the read adjustment patterns, as a write frequency of each of the magnetic heads; writes a plurality of spiral patterns including the sync mark in each predetermined cycle with the same frequency as each of the selected write frequencies, to each of the magnetic disks by each of the magnetic heads; and writes a servo pattern which is a reference to positioning control of seek of each of the magnetic heads, to each of the magnetic disks, by each of the magnetic heads, while tracking each of the written spiral patterns by each of the magnetic heads.

(1) A first embodiment will be described hereinafter with reference to the accompanying drawings.

As shown in FIG. 1, a magnetic disk device 100 includes a circular magnetic disk 1 serving as a recording medium, a spindle motor (SPM) 2 which drives rotation of the magnetic disk 1, and a magnetic head 10 which writes data to and reads data from the magnetic disk 1.

The magnetic head 10 is held in a freely rotatable manner by an actuator 20. The actuator 20 includes a rotation shaft 21, an arm 22 attached to the rotation shaft 21, a voice coil motor 23 which provides a rotational force to the arm 22, and a suspension member 24 attached to a distal end portion of the arm 22. The magnetic head 10 is attached to the distal end of the suspension member 24. The voice coil motor 23 includes a coil 23c, a magnet, and a yoke, and causes the arm 22 to be rotated by a drive current flowing through the coil 23c.

As shown in FIG. 2, the magnetic head 10 includes a write element 11 that writes magnetic data to the magnetic disk 1, and a read element (first read element) 12a and a read element (second read element) 12b that read data from the magnetic disk 1. The read elements 12a and 12b are arranged so as to be aligned along the rotational direction of the actuator 20 (i.e., the radial direction of the magnetic disk 1). The magnetic head 10 seeks (moves) along the radial direction of the magnetic disk 1 between a first position P1 represented by a broken line in the figure and a second position P2 represented by a solid line on the outer circumference in the figure, in accordance with the rotation of the actuator 20.

A stopper ST and a ramp mechanism RL are provided near the actuator 20. The stopper ST limits the moving position of the magnetic head 10 on the inner circumferential side of the magnetic disk 12. The ramp mechanism RL saves the magnetic head 10 from a position above the magnetic disk 1 when the spindle motor 2 is stopped.

Figure 3:
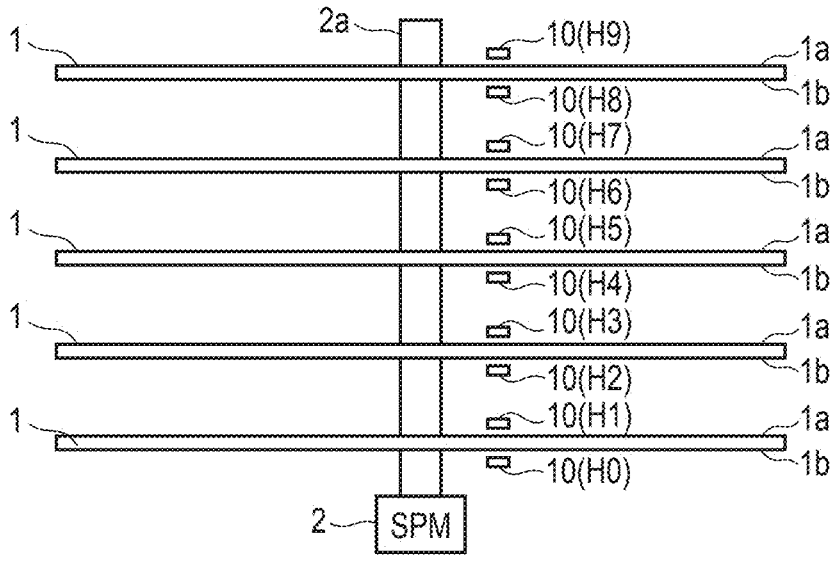
FIG. 3 is a view showing a relationship between each magnetic disk and each magnetic head in each of the embodiments.

As shown in FIG. 3, the magnetic disk 1 includes a pair of recording surfaces 1a and 1b in a front-back relationship. A plurality of (for example, five) magnetic disks 1 are provided coaxially on the rotation shaft 2a of the spindle motor 2 at predetermined intervals. One magnetic head 10 is provided in a state of facing each of the recording surfaces 1a and 1b of the magnetic disks 1. The magnetic heads 10 are assigned head numbers H0 to H9.

The magnetic head 10 with the head number H0 faces the recording surface 1b of the magnetic disk 1 at the first stage (i.e., the lowest stage), and the magnetic head 10 with the head number H1 faces the recording surface 1a of the magnetic disk 1 at the first stage. The magnetic head 10 with the head number H2 faces the recording surface 1b of the magnetic disk 1 at the second stage, and the magnetic head 10 with the head number H3 faces the recording surface 1a of the magnetic disk 1 at the second stage. The magnetic head 10 with the head number H4 faces the recording surface 1b of the magnetic disk 1 at the third stage, and the magnetic head 10 with the head number H5 faces the recording surface 1a of the magnetic disk 1 at the third stage. The magnetic head 10 with the head number H6 faces the recording surface 1b of the magnetic disk 1 at the fourth stage, and the magnetic head 10 with the head number H7 faces the recording surface 1a of the magnetic disk 1 at the fourth stage. The magnetic head 10 with the head number H8 faces the recording surface 1b of the magnetic disk 1 at the fifth stage (i.e., the uppermost stage), and the magnetic head 10 with the head number H9 faces the recording surface 1a of the magnetic disk 1 at the fifth stage.

When each magnetic disk 1 is rotated, each magnetic head 10 flies in a direction of separating from the magnetic disk 1 due to the wind pressure caused by the rotation.

As shown in FIG. 1, the magnetic disk device 100 includes a controller 30 which serves as the center of control, a head amplifier 41 which drives each of the magnetic heads 10, a signal processing circuit 42 provided in the connection between the head amplifier 41 and the controller 30, a motor driver 43 which drives the spindle motor 2 and the voice coil motor 23 in response to commands of the controller 30, a DRAM 45 serving as a memory which stores programs and the like necessary for the control of the controller 30, a flash ROM 46 serving as a memory which stores various data necessary for the control of the controller 30, and a hard disk controller (HDC) 47 provided in the connection between the controller 30 and an external host device 50.

The head amplifier 41 amplifies the write signals of the data from the signal processing circuit 42 to each of the magnetic heads 10, and amplifies the read signals of the data from each of the magnetic heads 10. The signal processing circuit 42 appropriately processes the write signals from the controller 30 to each magnetic head 10 and supplies the write signals to the head amplifier 41, and also appropriately processes the read signals amplified by the head amplifier 41 and supplies the read signals to the controller 30.

The controller 30 controls the rotation of each magnetic disk 1 and the seek of each magnetic head 10.

Figure 4:
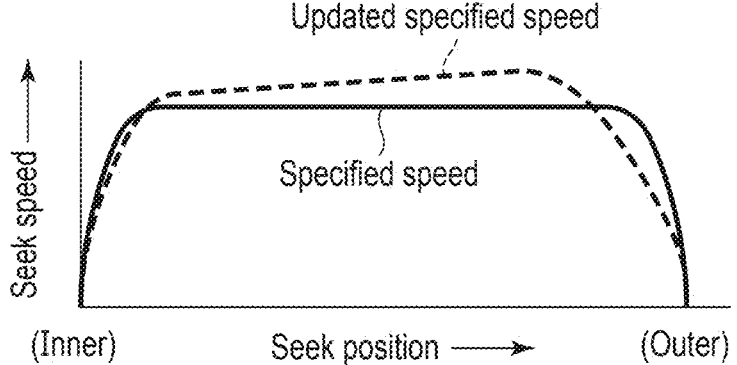
FIG. 4 is a table showing a seek speed of each magnetic head in each of the embodiments.

As regards the seek control of the controller 30, a seek speed table shown in FIG. 4 for specifying the seek speed of each magnetic head 10 is set for each magnetic head 10, and the seek speed table is stored in the flash ROM 46. The moving speed table stores a specified speed for specifying the seek speed of the magnetic head 10 in the radial direction of the magnetic disk 1, in accordance with the seek position of the magnetic head 10. The specified speed consists of an acceleration range in which the seek speed is accelerated from zero to a constant speed, a constant speed range in which the seek speed is maintained at a constant speed, and a deceleration zone in which the seek speed is decelerated from a constant speed to zero, when seeking from the innermost circumstance to the outermost circumstance of the magnetic head 10.

In the manufacturing process of the magnetic disk device 1, the controller 30 executes a process referred to as Self Servo Write (SSW) for writing a plurality of servo patterns that are references for the positioning control of each magnetic head 10, to each magnetic disk 1 that is a blank medium with no data recorded thereon.

In this process, the controller 30 defines any one magnetic head, for example, the magnetic head 10 with the head number H6 among ten magnetic heads 10 with the head numbers H0 to H9, as a first magnetic head, defines any one magnetic head, for example, the magnetic head 10 with the head number H2 as a second magnetic head, and defines the magnetic heads 10 with all the remaining head numbers H0, H1, H3, H4, H5, H7, H8, and H9 as third magnetic heads. In accordance with this, the controller 30 defines the magnetic disk 1 corresponding to the first magnetic head (H6) 10 as a first magnetic disk, defines the magnetic disk 1 corresponding to the second magnetic head (H2) 10 as a second magnetic disk, and defines each of the magnetic disks 1 corresponding to the respective third magnetic heads (H0, H1, H3, H4, H5, H7, H8, and H9) 10 as a third magnetic disk.

Then, the controller 30 executes the write process for the spiral pattern and the servo pattern using the first magnetic head (H6) 10, the second magnetic head (H2) 10, and each of the third magnetic heads (H0, H1, H3, H4, H5, H7, H8, and H9) 10.

Figure 5:
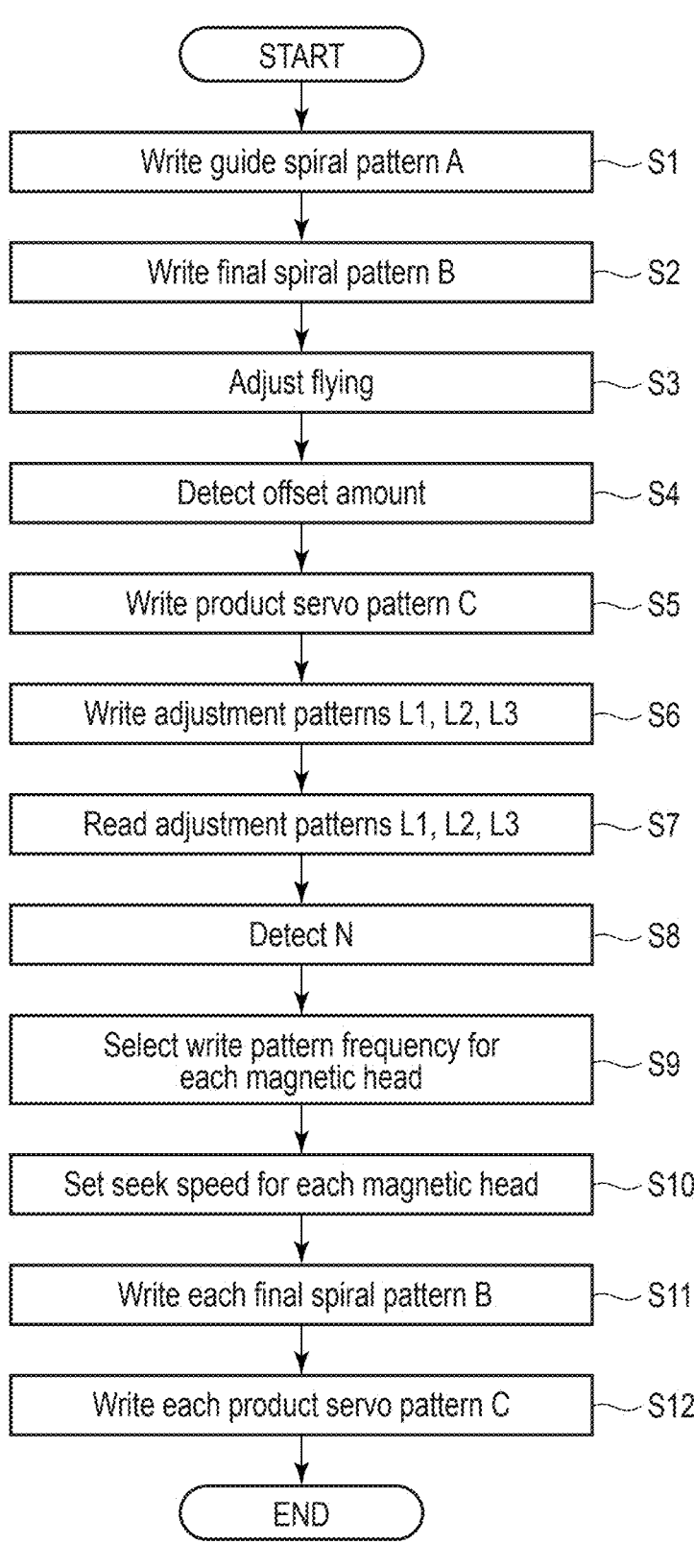
FIG. 5 is a flowchart showing control of the first embodiment.

This write process will be described with reference to a flowchart in FIG. 5 and a pattern format in FIG. 6.

Figure 7:
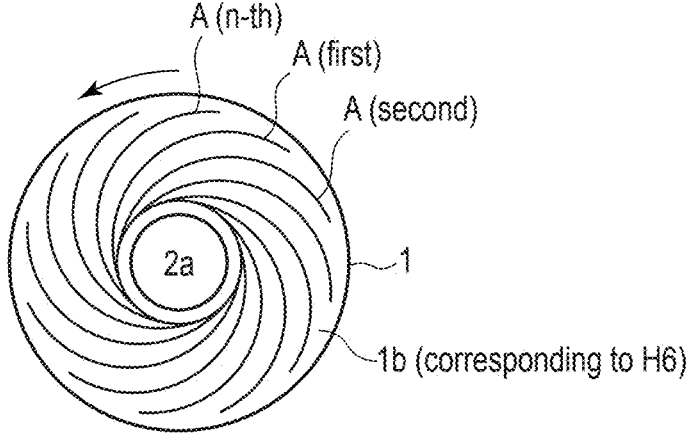
FIG. 7 is a view showing each guide spiral pattern in each of the embodiments.

First, the controller 30 seeks the first magnetic head (H6) 10 radially from the inner circumferential side to the outer circumferential side of the first magnetic disk 1 at the specified speed in the seek speed table while rotating each magnetic disk 1 at a constant speed, writes the plurality of guide spiral patterns A shown in FIG. 7 to the first magnetic disk 1 at predetermined intervals by the first magnetic head 10 while executing the seek of the first magnetic head 10 in the circumferential direction of the first magnetic disk 1 a plurality of times in the circumferential direction of the first magnetic disk 1 (S1).

Figure 8:
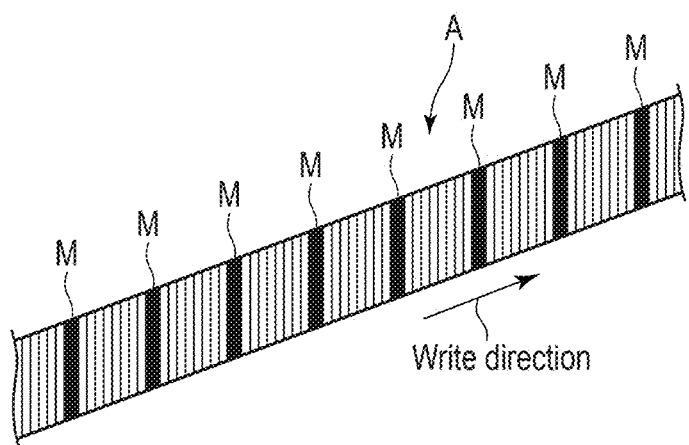
FIG. 8 is a view showing a magnetic variation of each guide spiral pattern and each sync mark in each of the embodiments.

Each guide spiral pattern A is a magnetic pattern in which the magnetic intensity changes at a predetermined frequency along the write direction and includes a sync mark M at each predetermined cycle, as shown in FIG. 8.

Next, the controller 30 writes a plurality of (for example, 310) first final spiral patterns B of a predetermined frequency shown in FIG. 9 to the second magnetic disk 1 at predetermined intervals by the second magnetic head (H2) 10 while tracking each of the written guide spiral patterns A by the first magnetic head (H6) 10 and the second magnetic head (H2) 10 following the first magnetic head (H6) 10 (S2).

As shown in FIG. 8, each first final spiral pattern B is a magnetic pattern in which the magnetic intensity varies at a predetermined frequency along the write direction and which includes a sync mark M at each predetermined cycle.

Then, the controller 30 adjusts the flying position of each magnetic head 10 relative to each magnetic disk 1 to an appropriate state while tracking each of the written first final spiral patterns B by the second magnetic head (H2) 10 and all the remaining magnetic heads 10 following the second magnetic head (H2) 10 (S3).

Furthermore, the controller 30 detects an offset amount referred to as an R/W offset amount between the write element 11 and the read element 12a of the second magnetic head (H2) 10 while tracking each of the written first final spiral patterns B by the second magnetic head (H2) 10 (S4). As shown in FIG. 10, the R/W offset amount changes in accordance with the seek position of the second magnetic head (H2) 10.

Figure 11:
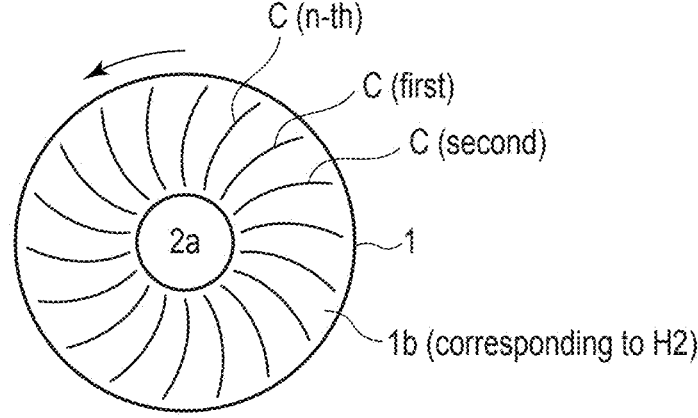
FIG. 11 is a view showing each servo pattern in each of the embodiments.

Next, the controller 30 writes a plurality of spiral servo patterns as shown in FIG. 11 referred to as product servo patterns C, which are references to the positioning control of seek of the detected R/W offset amount, to the second magnetic disk 1 at predetermined intervals by the second magnetic head (H2) 10, while tracking each of the written first final spiral patterns B by the second magnetic head (H2) 10 and while considering the detected R/W offset amount (S5).

The shape of each product servo pattern C may not be limited to a spiral shape, but may also be a shape extending linearly in the radial direction of the magnetic disk 1.

Figure 12:
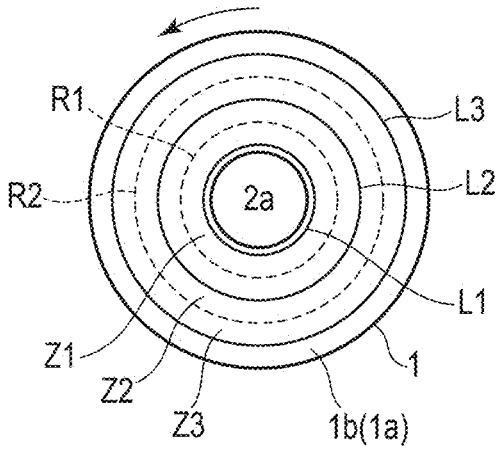
FIG. 12 is a view showing each adjustment pattern in each of the embodiments.

Then, the controller 30 writes a plurality of circular adjustment patterns L1, L2, and L3 shown in FIG. 12, which include sync marks M at predetermined intervals with different frequencies F1, F2, and F3, one by one, to an inner zone Z1, a middle zone Z2, and an outer zone Z3 that are set sequentially along the radial direction of each third magnetic disk 10 by each third magnetic head 10, while tracking each of the written product servo patterns C by the second magnetic head (H2) 10 and each of the third magnetic heads (H0, H1, H3, H4, H5, H7, H8, and H9) 10 following the second magnetic head (H2) 10 (S6).

As shown in FIG. 12, the adjustment patterns L1, L2, and L3 are magnetic patterns in which the magnetic intensity changes along the write direction at frequencies F1, F2, and F3 and which include the sync marks M at predetermined intervals. The frequencies F1, F2, and F3 of the adjustment patterns L1, L2, and L3 have a relationship in magnitude F1<F2<F3. In addition to the adjustment patterns L1, L2, and L3, adjustment patterns L4 to Ln with frequencies F4 to Fn that are to be used in a case of setting zones Z4 to Zn are also prepared in advance.

Figure 14:
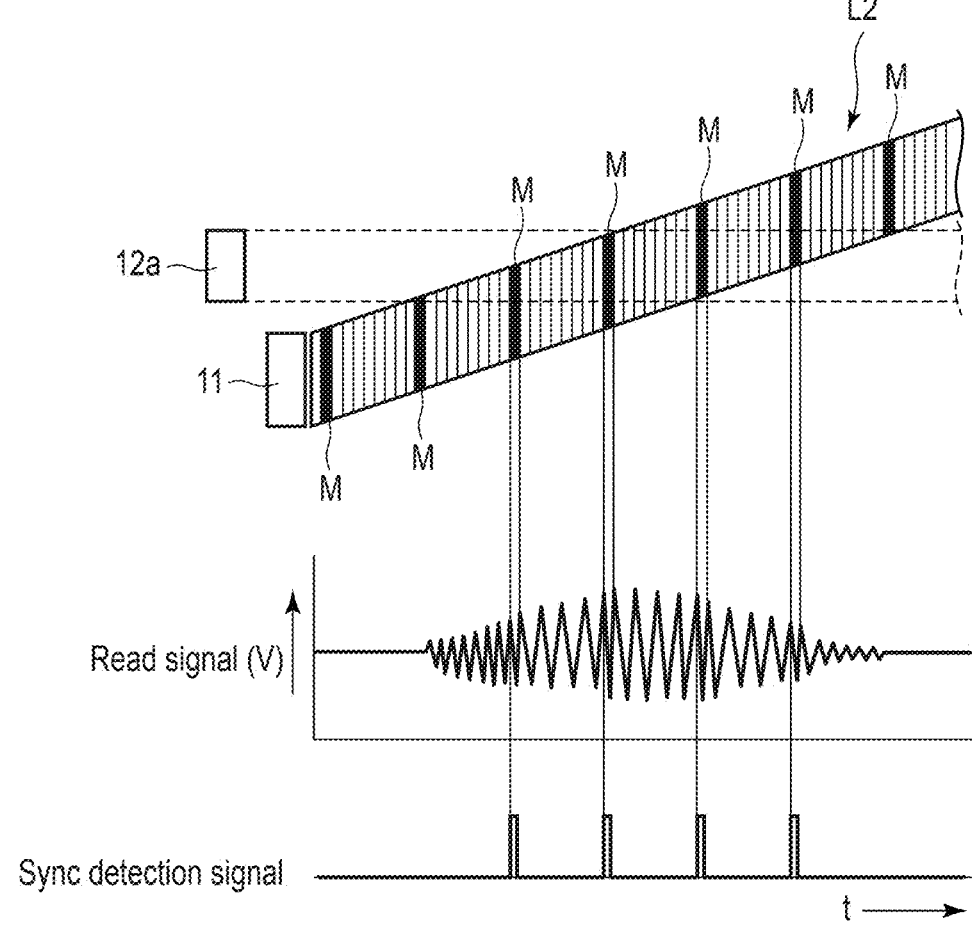
FIG. 14 is a chart showing a correspondence between a read element of a magnetic head and an adjustment pattern L2 in each of the embodiments together with a read signal of the magnetic head.
Figure 15:
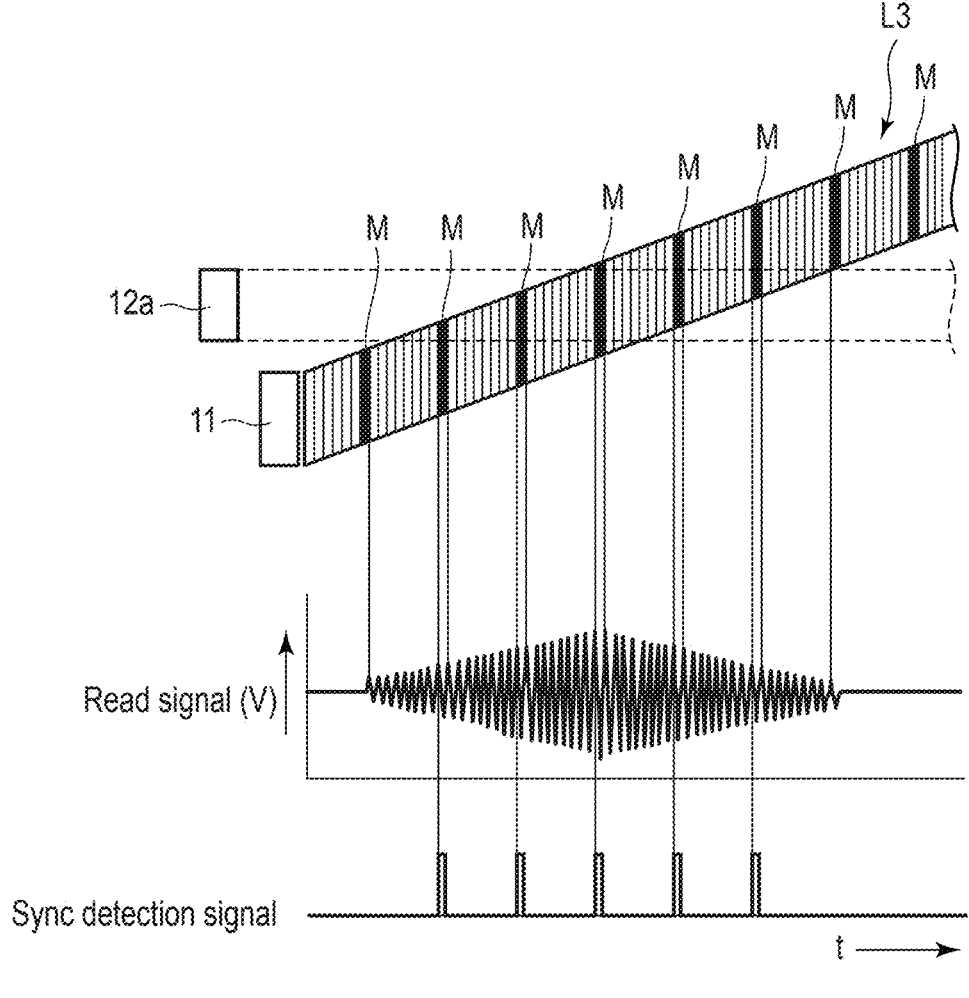
FIG. 15 is a chart showing a correspondence between a read element of a magnetic head and an adjustment pattern L3 in each of the embodiments together with a read signal of the magnetic head.

Next, the controller 30 reads the written adjustment patterns L1, L2, and L3 with each of the third magnetic heads (H0, H1, H3, H4, H5, H7, H8, and H9) 10 as shown in FIG. 14 and FIG. 15 (S7). Then, the controller 30 detects the number N of signal components of the sync mark M included in the read signal of each third magnetic head 10 (S8).

FIG. 14 shows the correspondence between the adjustment pattern L2 written by the write element 11 of the third magnetic head 10 and the read element 12a of the third magnetic head 10, together with the read signal of the third magnetic head 10. If the data write width (i.e., the width dimension in the direction orthogonal to the write direction) of the adjustment pattern L2 written by the write element 11 is narrow, the read area of the third magnetic head 10 for the adjustment pattern L2 becomes relatively small. In accordance with this, the number N of signal components of the sync mark M included in the read signal of the third magnetic head 10 is reduced.

FIG. 15 shows the correspondence between the adjustment pattern L3 written by the write element 11 of the third magnetic head 10 and the read element 12a of the third magnetic head 10, together with the read signal of the third magnetic head 10. If the data write width (i.e., the width dimension in the direction orthogonal to the write direction) of the adjustment pattern L3 written by the write element 11 is narrow, the read area of the third magnetic head 10 for the adjustment pattern L3 becomes relatively small. However, since the frequency F3 of the adjustment pattern L3 is higher than the frequency F2 of the adjustment pattern L2, the number N of signal components of the sync mark M included in the read signal of the third magnetic head 10 is not reduced.

After detecting the number N, the controller 30 individually selects the frequency of the adjustment pattern for which the detected number N larger than or equal to the threshold value Ns (for example, 5) among the read adjustment patterns L1, L2, and L3 as the write frequency of each third magnetic head 10, for each third magnetic head 10 (S9). For example, if the detected number N from the adjustment pattern L3 is larger than or equal to the threshold value Ns, the controller 30 selects the frequency F3 of the adjustment pattern L3 as the write frequency of the third magnetic head 10. If the detected numbers N from the adjustment patterns L2 and L3 are both larger than or equal to the threshold value Ns, then the controller 30 selects either the frequency F2 of the adjustment pattern L2 or the frequency F3 of the adjustment pattern L3 as the write frequency of the third magnetic head 10.

In accordance with this selection, the controller 30 sets the seek speed of each third magnetic head 10 to a value corresponding to each of the selected write pattern frequencies and to a state in which the value gradually becomes large from the inner circumferential position (inner circumference zone Z1) to the outer circumferential position (outer circumference zone Z3) along the radial direction of each third magnetic disk 1 along the radial direction of each third magnetic disk 1 (S10). Then, the controller 30 updates and stores the set seek speed as a new specified speed (i.e., an updated specified speed represented by a broken line in the figure) in each seek speed table (FIG. 4) for each of the third magnetic heads 10 inside the flash ROM 46. The new specified speed is gradually lower than the original specified speed when the seek position is on the inner circumferential side, and is gradually higher as the seek position moves from the inner circumferential side to the outer circumferential side.

After setting the seek speed, the controller 30 writes a plurality of (for example, 310) second final spiral patterns B shown in FIG. 9, which include the sync marks M at predetermined intervals at the same frequency as each of the selected write frequencies, to each third magnetic disk 1 at predetermined intervals by each third magnetic head, while tracking the servo pattern C written to the second magnetic disk 1, by the second magnetic head (H2) 10 and each of the third magnetic heads 10 following the second magnetic head (H2) 10 (S11).

When tracking, the controller 30 causes the second magnetic head (H2) 10 to seek at the updated specified speed for each third magnetic head 10 and causes each of the third magnetic heads 10 to seek at the updated specified speed in the seek speed table for each third magnetic head 10.

As shown in FIG. 8, each second final spiral pattern B is a magnetic pattern in which the magnetic intensity varies at a predetermined frequency along the write direction and which includes a sync mark M at each predetermined cycle.

Next, the controller 30 writes a plurality of spiral servo patterns as shown in FIG. 11 referred to as product servo patterns C, which are references to the positioning control of seek of each third magnetic head, to each third magnetic disk 1 at predetermined intervals by each of the third magnetic heads 10, while tracking each of the written second final spiral patterns B by each of the third magnetic heads 10 (S12). When tracking, the controller 30 causes each of the third magnetic heads 10 to seek at the updated specified speed in the seek speed table for each third magnetic head 10.

The shape of each product servo pattern C may not be limited to a spiral shape, but may also be a shape extending linearly in the radial direction of the magnetic disk 1.

Incidentally, the data write width (i.e., the width dimension in the direction orthogonal to the write direction) of each magnetic head 10 mounted on the magnetic disk device

100 is not constant due to manufacturing variations. In some cases, a wide spiral pattern is written or a narrow spiral pattern is written.

When a narrow spiral pattern is written, the read area of the magnetic head 10 for the spiral pattern becomes relatively small. In accordance with this, the signal components of the sync mark M included in the read signal of the magnetic head 10 are reduced. As a result, errors may occur in the tracking of the spiral pattern. The errors become factors that worsen the accuracy in writing the product servo pattern C.

A relationship between the number N of sync marks M detected from the read signals of each of the magnetic heads 10 and the seek position (zone) of each magnetic head 10 in prior art is shown for reference in FIG. 16. The detected number N of the sync marks M fluctuates depending on the seek position, and there is also "variation" in the detected number N of the sync marks M for each magnetic head 10.

As regards such a problem, the controller 30 writes a plurality of adjustment patterns C1, C2, and C3 that include a sync mark M at each predetermined cycle with frequencies F1, F2, and F3 different from each other, to each third magnetic disk 1, by each of the third magnetic heads 10, reads the written adjustment patterns C1, C2, and C3 by each of the third magnetic heads 10, and detects the number N of signal components of the sync mark M included in the read signal of each of the third magnetic heads 10.

Furthermore, the controller 30 selects the frequency of the adjustment pattern from which the detected number N larger than or equal to the threshold value Ns can be obtained, among the read adjustment patterns C1, C2, and C3, as the write frequency for each of the third magnetic heads 10, and writes a plurality of second spiral patterns B that include the sync mark M at the predetermined cycle with the same frequency as each of the selected write frequency, to each of the third magnetic disks 1 by each of the third magnetic head 10.

Then, the controller 30 writes a plurality of product servo patterns C, which are references to the positioning control of seek of each third magnetic head 10, to each of the third magnetic disks 10 by each of the third magnetic heads 10, while tracking each of the written second final spiral patterns B by each of the third magnetic heads 10.

Therefore, even if a narrow second spiral pattern B is written and the read area of the magnetic head 10 for the second spiral pattern B is relatively small, the inconvenience that the signal components of the sync mark M included in the read signal of the magnetic head 10 can be eliminated. In other words, each sync mark M included in the second spiral pattern B can be accurately detected. As a result, no errors occur in tracking of the second spiral pattern B, and the product servo pattern C can be written with high accuracy.

A relationship between the number N of sync marks M detected from the read signals of each magnetic head 10 and the seek position (zone) of each magnetic head 10 is shown in FIG. 17. Regardless of the seek position, the detected number N of the sync marks M is stable, and the "variation" in the detected number N of sync marks M for each magnetic head 10 is also suppressed.

Incidentally, when the spiral pattern is written at a constant seek speed, the density of the magnetic changes in the written spiral pattern increases on the outer circumferential side of the magnetic disk 1 as compared to the inner circumferential side, and the amplitude of the written spiral pattern is therefore reduced.

As regards this problem, since the controller 30 sets the seek speed of each third magnetic head 10 that writes each second spiral pattern B to a value corresponding to each of the selected write pattern frequencies and to a state in which the value gradually becomes large from the inner circumferential position (inner circumference zone Z1) to the outer circumferential position (outer circumference zone Z3) along the radial direction of each third magnetic disk 1. Therefore, the controller 30 can eliminate the inconvenience that the amplitude of the written spiral pattern is unnecessarily reduced. In addition, the product servo pattern C can be written with high accuracy.

In addition, the written adjustment patterns C1, C2, and C3 are no longer needed and are desirably erased after the signal components of the sync mark M are detected. For example, AC erase is executed at a frequency four times the frequency of the adjustment patterns C1, C2, and C3. Alternatively, the detection address pattern (SAM) for each sync mark M in the adjustment patterns C1, C2, and C3 does not need to be erased by being set to be different from the detection address pattern for the normal spiral pattern.

In contrast, as shown in FIG. 18, the controller 30 includes a basic clock unit 31 that generates basic clock signals (50 MHZ), a Time Base Generator (TBG) PLL circuit 32 that generates clock signals for data read of each magnetic head 10 from the basic clock signal generated by the basic clock unit 31, and a Servo Frequency Generator (SFG) PLL circuit 33 that generates clock signals for data write of each magnetic head 10 from the basic clock signal generated by the basic clock unit 31.

The frequency of each product servo pattern C can be set to be variable in accordance with the seek position of each magnetic head 10 along the radial direction of each magnetic disk 1, as shown in FIG. 19, by using Constant Density Servo (CDS) function disclosed in, for example, U.S. Pat. No. 7,349,171 B. For example, the frequency of each product servo pattern C can be changed continuously and smoothly by dividing the seek position of each magnetic head 10 into ten zones from the inner circumferential side to the outer circumferential side of each magnetic disk 1 and by setting the frequency of each product servo pattern C to be variable for each zone.

Similarly, the frequency of each final spiral pattern B can be set to be variable in accordance with the seek position of each magnetic head 10 along the radial direction of each magnetic disk 1, as shown in FIG. 19, by using the Constant Density Servo (CDS) function.

Next, a method of obtaining the seek speed of each third magnetic head 10 from the pattern frequency selected for each third magnetic head 10 will be described.

A skew angle $\theta$ of the magnetic head 10 relative to the magnetic disk 1 is shown in FIG. 2.

Variables are defined in the following manners based on the relationship in arrangement of the magnetic head 10 and the magnetic disk 1.

Vact refers to the seek speed (also referred to as an actuator speed) of the magnetic head 10.

Rot refers to the rotational speed (RPM) of the magnetic disk 1.

Cyl_Rad refers to the seek position of the magnetic head 10 (i.e., the radial position of the magnetic disk 1).

$\theta$ refers to the skew angle at a specific seek position of the magnetic head 10.

$\varphi$ is the pivot angle of the magnetic head 10.

In this case, the radial component of the seek speed of the magnetic head 10 can be expressed as Vact*cos $\theta$, and the circumferential component of the seek speed of the magnetic head 10 can be expressed as Vact*sin $\theta$.

The linear angular velocity Wips (inch per second) of the magnetic disk 1 can be expressed by the following formula.

$$Wips=Rot*2\pi*Cyl\_Rad/60$$

Based on the above relationship, "difference (Freq_diff)" between the data write frequency and the data read frequency at the specific seek position of the magnetic head 10 can be expressed as a ratio of the circumferential component and the linear angular velocity component of the magnetic disk 1 as expressed below.

$$Freq\_diff=60*(Vact*sin\ \theta/Rot*(2\pi*Cyl\_Rad))*cos\ \varphi$$

Since the skew angle @ component and the pivot angle $\varphi$ of the actuator are included in the calculation formula of the "difference (Freq_diff)" in frequency and are obtained by multiplication, the data write frequency can be calculated from the data read frequency. In other words, if the write frequency of the magnetic head 10 is determined, the speed of the magnetic head 10 at a specific seek position (radial position) can be obtained. In other words, the seek speed of the magnetic head 10 when writing the final spiral pattern B can be obtained by calculation.

(2) A second embodiment will be described.

Figure 20:
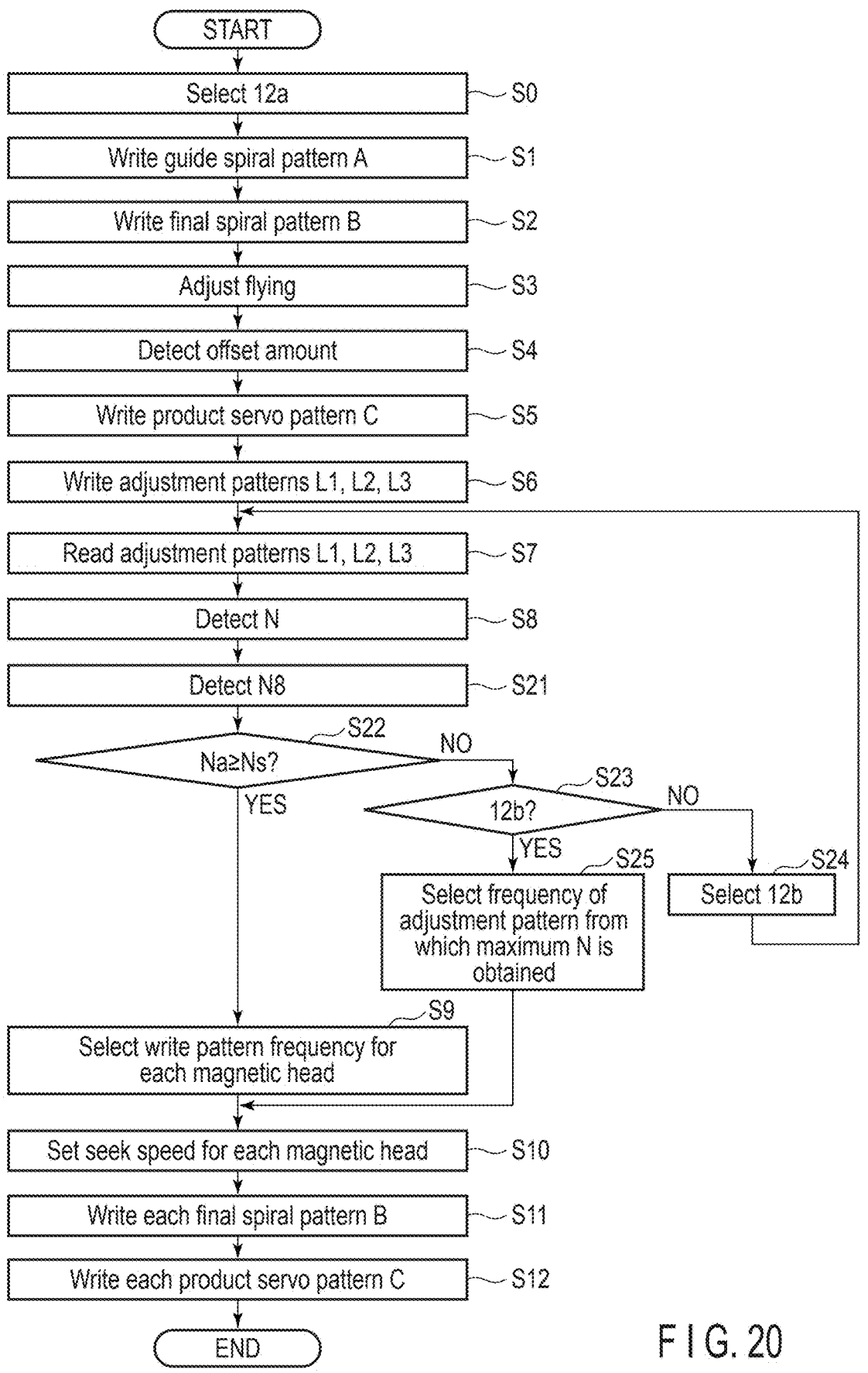
FIG. 20 is a flowchart showing control of a second embodiment.

In the process (SSW) of writing the servo pattern C that is a reference to positioning control of each magnetic head 10, the controller 30 first selects the read element 12a among the read element 12a and the read element 12b of each magnetic head 10 as a read element for data read (S0), as shown in the flowchart of FIG. 20.

Then, after executing the same processes S1 to S8 as those in the first embodiment, the controller 30 sums up the number N of signal components of the sync mark M detected from the read signal for the adjustment pattern L1, the number N of signal components of the sync mark M detected from the read signal for the adjustment pattern L2, and the number N of signal components of the sync mark M detected from the read signal for the adjustment pattern L3. And then, the controller 30 calculates the average value Na of each detected number N for each third magnetic head 10 by dividing the sum by the number of adjustment patterns L1, L2, and L3 (S21).

For the third magnetic head for which the average value Na larger than or equal to the threshold value N is obtained (YES in S22), the controller 30 selects the frequency of the adjustment pattern from which the detected number N larger than or equal to the threshold value Ns is obtained as the write frequency, similarly to the first embodiment (S9).

For the third magnetic head for which the average value Na larger than or equal to the threshold value N cannot be obtained (NO in S22), the controller 30 determines which of the read elements 12a and 12b of the third magnetic head 10 has already been selected as the read element for data read (S23).

If the read element 12a has already been selected (NO in S23), the controller 30 selects the read element 12b of the corresponding third magnetic head (i.e., a magnetic head from which the average value Na larger than or equal to the threshold value N) 10 as the read element for data read (S24). After this selection, the controller 30 repeats the above-described process S7.

After repeating the process S7, the controller 30 sums up the number N of signal components of the sync mark M detected from the read signal for the adjustment pattern L1, the number N of signal components of the sync mark M detected from the read signal for the adjustment pattern L2, and the number N of signal components of the sync mark M detected from the read signal for the adjustment pattern L3. And then, the controller 30 recalculates the average value Na of each detected number N for each third magnetic head 10 by dividing the sum by the number of adjustment patterns L1, L2, and L3 (S21).

For the third magnetic head for which the average value Na larger than or equal to the threshold value N is obtained (YES in S22), the controller 30 selects the frequency of the adjustment pattern from which the detected number N larger than or equal to the threshold value Ns is obtained as the write frequency, similarly to the first embodiment (S9).

For the third magnetic head for which the average value Na larger than or equal to the threshold value N cannot be obtained (NO in S22), the controller 30 redetermines which of the read elements 12a and 12b of the third magnetic head 10 has already been selected as the read element for data read (S23). In this case, since the read element 12b has already been selected (NO in S23), the controller 30 selects the frequency of the adjustment pattern from which the maximum detected number N is obtained, as the write frequency of the third magnetic head 10 (S25).

For example, if the detected number N from the adjustment pattern L2 among the detected numbers N from the adjustment patterns L1, L2, and L3 is maximum, the controller 30 selects the frequency F2 of the adjustment pattern L2 as the write frequency of the third magnetic head 10. If the detected number N from the adjustment pattern L3 is maximum, the controller 30 selects the frequency F3 of the adjustment pattern L3 as the write frequency of the third magnetic head 10.

Therefore, even if the sync mark M can no longer be detected due to the inconvenience of the read element 12a or the like, the sync mark M can be accurately detected by using the read element 12b.

The other configuration and advantages are the same as those of the first embodiment.

(3) The third embodiment will be described.

In the process (SSW) of writing the servo pattern C that is a reference to positioning control of each magnetic head 10, the waveform of the write signal supplied to the read element 12a or read element 12b for writing each of the adjustment patterns L1, L2, L3, . . . changes to holding "−Iw level, overshooting from the "−Iw" level to "+Iw+OSA" level, holding the "+Iw+OSA" level for a certain period of time "OSD", drop from the "+Iw+OSA" level to "+Iw" level, holding the "+Iw" level, overshooting from the "+Iw" level to "−Iw+OSA" level, holding the "−Iw+OSA" level for a certain period of time "OSD", rise from the "−Iw+OSA" level to "−Iw" level, and holding the "−Iw" level, in a constant cycle T, as shown in FIG. 21.

The controller 30 stores in its internal memory a plurality of write conditions W1, W2, . . . . Wn that parameters "Iw", "OSA", and "OSD" of the write signals are different from each other, as shown in FIG. 22. The write status of the adjustment pattern L1, L2, L3, . . . . Ln change depending on which of the write conditions W1, W2, . . . . Wn X1, X2, . . . . Xn is used.

The control executed by the controller 30 for the write of the adjustment pattern L1, L2, L3, . . . Ln will be described with reference to a flowchart in FIG. 23.

When executing the write process of the first adjustment pattern L, the controller 30 selects the write condition W1 corresponding to the condition specification number n=1 (S31), and then writes the first adjustment pattern L to the magnetic disk 1 using the write condition W1 (S32). Next, the controller 30 offsets the write position of the magnetic head 10 (S33) and increments the condition specification number n by 1 (S34). Then, the controller 30 determines whether or not the condition specification number n (=2) incremented by 1 reaches a predetermined maximum value ns (S35).

If the condition specification number n does not reach the threshold value ns (NO in S35), the controller 30 returns to the process S31, selects the write condition W2 corresponding to the condition specification number n=2 (S31), and writes the second adjustment pattern L to the magnetic disk 1 using the write condition W2 (S32). Next, the controller 30 offsets the write position of the magnetic head 10 (S33) and increments the condition specification number n by 1 (S34). Then, the controller 30 determines whether or not condition specification number n (=3) incremented by 1 reaches the maximum value ns (S35).

If the condition specification number n does not reach the threshold value ns (NO in S35), the controller 30 returns to the process S31, selects the write condition W3 corresponding to the condition specification number n=3 (S31), and writes the third adjustment pattern L to the magnetic disk 1 using the write condition W3 (S32). Next, the controller 30 offsets the write position of the magnetic head 10 (S33) and increments the condition specification number n by 1 (S34). Then, the controller 30 determines whether or not the condition specification number n (=4) incremented by 1 reaches the maximum value ns (S35).

After that, the controller 30 repeats the same processes.

By preliminarily determining the detailed write conditions W1, W2, . . . . Wn for the waveforms of the write signals of the adjustment patterns L1, L2, L3, . . . and by writing the adjustment patterns L1, L2, L3, while sequentially specifying the write conditions W1, W2, . . . . Wn, desirable adjustment patterns L1, L2, L3, . . . whose magnetic intensity changes variously can be written to each of the magnetic disks 1.

The other configuration and advantages are the same as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a plurality of rotatable magnetic disks;
   a plurality of magnetic heads capable of seeking in a radial direction of each of the magnetic disks to write data to and read data from each of the magnetic disks; and
   a controller which controls the rotation of each of the magnetic disks and the seek of each of the magnetic heads, wherein
   the controller
   writes a plurality of adjustment patterns including a sync mark in each predetermined cycle with different frequencies, to each of the magnetic disks by each of the magnetic heads;
   reads each of the written adjustment patterns by each of the magnetic heads, and detects the number of signal components of the sync mark included in the read signal of each of the magnetic heads;

selects a frequency of an adjustment pattern from which the detected number larger than or equal to a threshold value is obtained, among the read adjustment patterns, as a write frequency for each of the magnetic heads;

writes a plurality of spiral patterns including the sync mark in each predetermined cycle with the same frequency as each of the selected write frequencies, to each of the magnetic disks by each of the magnetic heads; and writes a servo pattern which is a reference to positioning control of seek of each of the magnetic heads, to each of the magnetic disks, by each of the magnetic heads, while tracking each of the written spiral patterns by each of the magnetic heads.

2. The device according to claim 1, wherein the controller sets a seek speed of each of the magnetic heads to a value corresponding to each of the selected write pattern frequencies.

3. The device according to claim 1, wherein the controller sets a seek speed of each of the magnetic heads to a value corresponding to each of the selected write pattern frequencies and to a state in which the value becomes gradually larger from an inner circumferential position to an outer circumferential position along the radial direction of each of the magnetic disks.

4. The device according to claim 1, wherein the controller includes a basic clock section which generates a basic clock signal, a circuit which generates a clock signal for data read of each of the magnetic heads from the basic clock signal generated by the basic clock section, and a circuit which generates a clock signal for data write of each of the magnetic heads from the basic clock signal generated by the basic clock section.

5. The device according to claim 1, wherein each of the magnetic heads includes a write element for data write, and a first read element and a second read element for data read, and the controller selects the first read element among the first read element and the second read element of each of the magnetic heads as a data read element, as for the magnetic head from which the detected number larger than or equal to the threshold value cannot be obtained, selects the second read element of the magnetic head as a read element for data read, and as for the magnetic head from which the detected number larger than or equal to the threshold value cannot be obtained after the selection of the second read element, selects a frequency of an adjustment pattern from which the maximum detected number can be obtained as a write frequency.

6. A magnetic disk device comprising:

a first magnetic disk, a second magnetic disk, and a plurality of third magnetic disks, which are rotatable;

a first magnetic head capable of seeking in a radial direction of the first magnetic disk to write data to and read data from the first magnetic disk;

a second magnetic head capable of seeking in a radial direction of the second magnetic disk to write data to and read data from the second magnetic disk;

a plurality of third magnetic heads capable of seeking in a radial direction of each of the third magnetic disks to write data to and read data from each of the third magnetic disks; and a controller which controls rotation of the first magnetic disk, the second magnetic disk, and the plurality of third magnetic disks, and controls seek of the first magnetic head, the second magnetic head, and the plurality of third magnetic heads, wherein the controller writes a guide spiral pattern to the first magnetic disk by the first magnetic head, writes a first final spiral pattern of a predetermined frequency including a sync mark in each predetermined cycle to the first magnetic disk by the second magnetic head while tracking the written guide spiral pattern by the first magnetic head and the second magnetic head following the first magnetic head, writes a servo pattern which is a reference to positioning control of seek of the second magnetic head, to the second magnetic disk by the second magnetic head while tracking the written first final spiral pattern by the second magnetic head, writes a plurality of adjustment patterns including a sync mark in each predetermined cycle with different frequencies, to each of the third magnetic disks by each of the third magnetic heads, while tracking the written servo pattern by the second magnetic head and each of the third magnetic heads following the second magnetic head, reads each of the written adjustment patterns by each of the third magnetic heads and detects the number of signal components of the sync mark included in the read signal of each of the third magnetic heads, selects a frequency of an adjustment pattern from which the detected number larger than or equal to a threshold value is obtained, among the read adjustment patterns, as a write frequency of each of the third magnetic heads, writes a plurality of second adjustment patterns including a sync mark in each predetermined cycle with the same frequency as each of the selected write frequencies, to each of the third magnetic disks by each of the third magnetic heads, while tracking the written servo pattern by the second magnetic head and each of the third magnetic heads following the second magnetic head, and writes a servo pattern which is a reference to positioning control of seek of the each of the third magnetic heads, to each of the third magnetic disks by each of the third magnetic heads while tracking each of the written second final spiral patterns by each of the third magnetic heads.

7. The device according to claim 6, wherein the controller sets a seek speed of each of the third magnetic heads to a value corresponding to each of the selected write pattern frequencies.

8. The device according to claim 6, wherein the controller sets a seek speed of each of the third magnetic heads to a value corresponding to each of the selected write pattern frequencies and to a state in which the value becomes gradually larger from an inner circumferential position to an outer circumferential position along the radial direction of each of the third magnetic disks.

9. The device according to claim 6, wherein the controller includes a basic clock unit generating a basic clock signal, a circuit generating a clock signal for data read of each of the magnetic heads from the basic clock signal generated by the basic clock unit, and a circuit generating a clock signal for data write of each of the magnetic heads from the basic clock signal generated by the basic clock unit.

10. The device according to claim 6, wherein each of the magnetic heads includes a write element for data write, and a first read element and a second read element for data read, and the controller first selects the first read element among the first read element and the second read element of each of the magnetic heads as a data read element, as for the third magnetic head from which the detected number larger than or equal to the threshold value cannot be obtained, selects the second read element of the third magnetic head as a read element for data read, and as for the third magnetic head from which the detected number larger than or equal to the threshold value cannot be obtained after the selection of the second read element, selects a frequency of an adjustment pattern from which the maximum detected number can be obtained as a write frequency.

11. A method of controlling a magnet disk device comprising a plurality of rotatable magnetic disks; a plurality of magnetic heads capable of seeking in a radial direction of each of the magnetic disks to write data to and read data from each of the magnetic disks; and a controller controlling the rotation of each of the magnetic disks and the seek of each of the magnetic heads, the method comprising:

writing a plurality of adjustment patterns including a sync mark in each predetermined cycle with different frequencies, to each of the magnetic disks by each of the magnetic heads;

reading each of the written adjustment patterns by each of the magnetic heads, and detecting the number of signal components of the sync mark included in the read signal of each of the magnetic heads;

selecting a frequency of an adjustment pattern from which the detected number larger than or equal to a threshold value is obtained, among the read adjustment patterns, as a write frequency for each of the magnetic heads;

writing a plurality of spiral patterns including the sync mark in each predetermined cycle with the same frequency as each of the selected write frequencies, to each of the magnetic disks by each of the magnetic heads; and writing a servo pattern which is a reference to positioning control of seek of each of the magnetic heads, to each of the magnetic disks, by each of the magnetic heads, while tracking each of the written spiral patterns by each of the magnetic heads.

* * * * *